United States Patent
Ceccatelli et al.

(10) Patent No.: US 12,250,022 B2
(45) Date of Patent: Mar. 11, 2025

(54) OPTICAL PORT IDENTIFICATION

(71) Applicant: Telefonaktiebolaget LM Ericsson (publ), Stockholm (SE)

(72) Inventors: Riccardo Ceccatelli, Genoa (IT); Stefano Orsi, Genoa (IT); Francesco Cisamolo, Genoa (IT); Roberto Magri, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 60 days.

(21) Appl. No.: 17/924,401

(22) PCT Filed: May 11, 2020

(86) PCT No.: PCT/EP2020/063074
§ 371 (c)(1),
(2) Date: Nov. 10, 2022

(87) PCT Pub. No.: WO2021/228364
PCT Pub. Date: Nov. 18, 2021

(65) Prior Publication Data
US 2023/0188210 A1 Jun. 15, 2023

(51) Int. Cl.
| | | |
|---|---|---|
| H04B 10/079 | (2013.01) | |
| H04B 10/60 | (2013.01) | |
| H04J 14/02 | (2006.01) | |
| H04Q 11/00 | (2006.01) | |
| H04B 10/40 | (2013.01) | |
| H04B 10/50 | (2013.01) | |

(52) U.S. Cl.
CPC .... *H04B 10/07955* (2013.01); *H04J 14/0282* (2013.01); *H04Q 11/0062* (2013.01); *H04B 10/40* (2013.01); *H04B 10/50* (2013.01); *H04B 10/60* (2013.01); *H04Q 2011/0083* (2013.01)

(58) Field of Classification Search
None
See application file for complete search history.

(56) References Cited

U.S. PATENT DOCUMENTS 4,412,355 A * 10/1983 Terbrack ............... H04B 10/50
398/118
4,616,823 A * 10/1986 Yang .................. A63B 21/0054
601/36

(Continued)

FOREIGN PATENT DOCUMENTS

| CA | 2359452 A1 | 7/2000 |
|---|---|---|
| WO | 2018133932 A1 | 7/2018 |
| WO | 2021043424 A1 | 3/2021 |

*Primary Examiner* — Darren E Wolf
(74) *Attorney, Agent, or Firm* — Sage Patent Group (57) ABSTRACT

An indicator system (200) for optical ports (125) of a passive optical communications equipment (120). The indicator system comprises a plurality of photodetectors (510) configured to detect an optical signal on the optical ports and a plurality of (140) configured to indicate on which optical ports an optical signal is detected by the photodetector. The indicator system further comprises a power source (350) configured to provide power to the photodetectors (510) and indicators (140). The power source is self-contained at the passive optical communications equipment. The power source (350) comprises a mechanical to electrical converter (410).

14 Claims, 5 Drawing Sheets

(56) References Cited

U.S. PATENT DOCUMENTS

| | | | | |
|---|---|---|---|---|
| 5,764,404 | A | * | 6/1998 | Yamane .............. H04J 14/0221 |
| | | | | 359/341.44 |
| 5,889,736 | A | * | 3/1999 | Fujita .................... G04C 10/00 |
| | | | | 368/204 |
| 6,147,936 | A | * | 11/2000 | Nakajima .......... G01R 31/3648 |
| | | | | 368/204 |
| 2006/0011651 | A1 | * | 1/2006 | Bruna .................... B65D 83/75 |
| | | | | 222/36 |
| 2014/0112665 | A1 | * | 4/2014 | Lei ....................... G02B 6/4292 |
| | | | | 398/66 |
| 2014/0270772 | A1 | * | 9/2014 | Lutgen ................ H04B 10/272 |
| | | | | 398/66 |
| 2015/0078742 | A1 | * | 3/2015 | Wu ...................... H04B 10/079 |
| | | | | 398/25 |
| 2015/0304052 | A1 | | 10/2015 | Schemmann et al. |
| 2016/0211923 | A1 | * | 7/2016 | Hopewell ........... H04L 27/2601 |
| 2019/0052357 | A1 | * | 2/2019 | Huybrechts ...... H04B 10/07955 |

\* cited by examiner

OPTICAL PORT IDENTIFICATION

TECHNICAL FIELD

The disclosure relates to an apparatus and method for identifying optical ports, for example, on passive optical equipment.

BACKGROUND

Within radio access networks, e.g. using a Passive Optical Network (PON) and mobile Fronthaul networks (especially 4G and 5G), wavelength divisional multiplexing (WDM) technology is more and more used to exploit the capacity of the available fibers. To reduce operational expenditure and make the installation of the optical infrastructure as simple as possible, a great focus of the telecoms operators is now on the serviceability aspects.

One of these aspects is the correct optical interconnection between a Main site and Remote sites. This is critical because the optical interconnections are prone to mistakes and consequent waste of time and money. To facilitate and automate the correct interconnection among transceivers located at opposite sides of an optical link, a combination of different technologies and solutions are potentially available, at main and remote sites. Example technologies include:

Tunable Transceivers (at both ends).
Active Mux/Demux units with per-port monitoring and/or tunable filters.
Automatic end-to-end frequency tuning of transceivers according to proprietary or standard protocols (e.g. Gmetro).

The use of tunable transceivers is becoming frequent also in the access and fronthaul network domains, because their cost is not so high, and the advantages are wide for the operators (e.g. reduction of spare parts). On the other hand, the use of tunable filters is not viable in passive and cheap network solutions, and therefore fully-automated procedures for the end-to-end connectivity are not viable in these contexts. Nevertheless, it is required to improve the installation procedures and minimize the human effort and the possibility of mistakes.

The automatic tuning protocols work provided that the transmitting and receiving ports of a transceiver pair are coupled to the same wavelength port of the respective WDM mux/demux. If a wrong port is connected the auto-tuning protocols fail since no end-to-end (E2E) communication is set-up. It may then be hard to understand what went wrong, with associated high time/cost of troubleshooting.

SUMMARY

An aspect of the disclosure provides an indicator system for optical ports of a passive optical communications equipment. The indicator system comprises a plurality of photo-detectors configured to detect an optical signal on the optical ports, and a plurality of indicators configured to indicate on which optical ports an optical signal is detected by the photodetector. A power source is configured to provide power to the photodetectors and indicators. The power source is self-contained at the passive optical communications equipment. The power source comprises a mechanical to electrical converter.

A further aspect of the disclosure provides a method of operation of an indicator system for a passive optical communications equipment. The method comprises receiving a power supply from a power source, wherein the power source is self-contained at the passive optical communications equipment. The method further comprises detecting an optical signal on optical ports of the passive optical communications equipment, using the power supply; and indicating the presence of the optical signals on the optical ports with a plurality of indicators, using the power supply. The receiving the power supply comprises receiving the power supply from a mechanical to electrical converter.

BRIEF DESCRIPTION OF THE DRAWINGS

Embodiments of the disclosure will now be described, by way of example only, with reference to the accompanying drawings.

DETAILED DESCRIPTION

Figure 1:
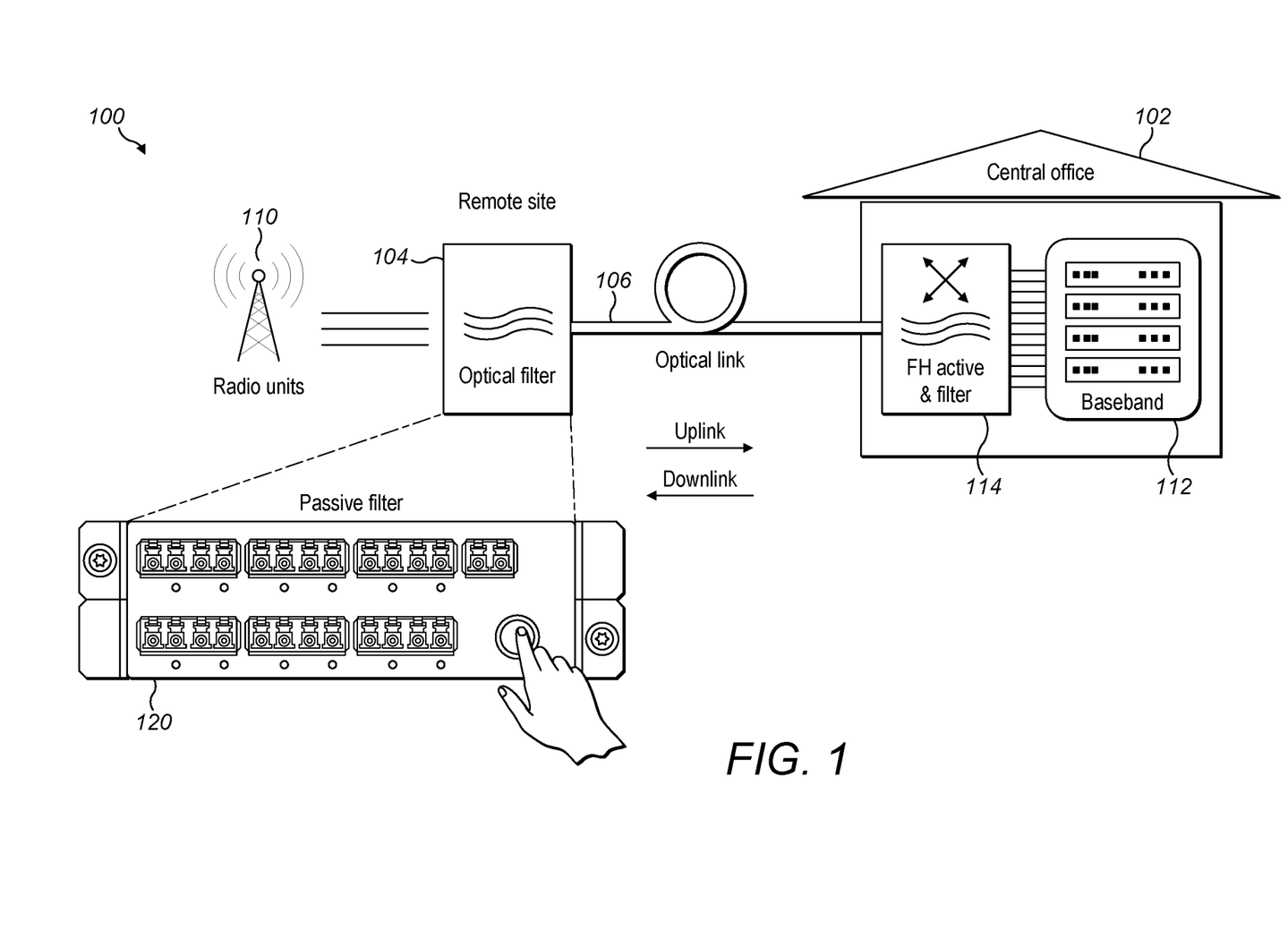
FIG. 1 shows an example of the network in which the present disclosure is implemented.

FIG. 1 shows an example of an optical network 100 according to the present disclosure. In this example, the optical network 100 is a fronthaul network. The disclosure is also applicable to other optical networks, e.g. in a radio access network, for example, a backhaul network.

In the optical network 100, a Central Office site (main site) 102 is connected to one or more remote site 104 by one or more optical links 106. The remote site 104 is connected to one or more radio units 110, also considered as remote radio units. The Central Office site 102 comprises a baseband unit 112 comprising baseband processing circuitry, e.g. for baseband processing of radio signals for transmission by (or received from) the radio unit 110. The Central Office site 102 may further comprise an active optical unit 114. The active optical unit 114 is configured filter optical signals and/or convert optical signals to a frequency for WDM multiplexing on the optical link 106. In some examples, the active optical unit 114 is configured to receive a grey optical signal (i.e. its frequency is not important) from the baseband processing unit. The active optical unit 114 converts the grey signal into a frequency which is different to other received grey optical signals, for adding to the WDM set of wavelengths for transmission on the optical link 106 to the radio units 110.

The optical signals carried on the optical link may be a digitized form of radio signal, e.g. Common Public Radio Interface (CPRI) signals.

The remote site 104 is close to radio units 110 and radio antennas (which may be connected to or integrated with the radio unit 110). The remote site 104 comprises an optical filter unit 120 configured for demultiplexing (in downstream direction and multiplexing in upstream direction) the WDM signal on the optical link 106 and distributing the optical signals to the Radio units 110 where transceivers are located. The remote site 104 is a passive site. The communications equipment is passive, i.e. without a power supply. For example, a conventional optical filter unit 120 is fully passive. The optical filter unit 120 may be located in an enclosure installed in a suitable location for connection to the radio unit 110. For example, the remote site is on the antenna's pole, inside a handhole or in other types of enclosures near the Radio units and antennas. A conventional optical filter unit is passive and no kind of monitoring or active visual interface is available on the optical filter unit.

The passive optical filter unit 120 is modified with an indicator system of the present disclosure to have a means to know exactly which connectors are to be used on the passive optical filter ports.

Figure 2:
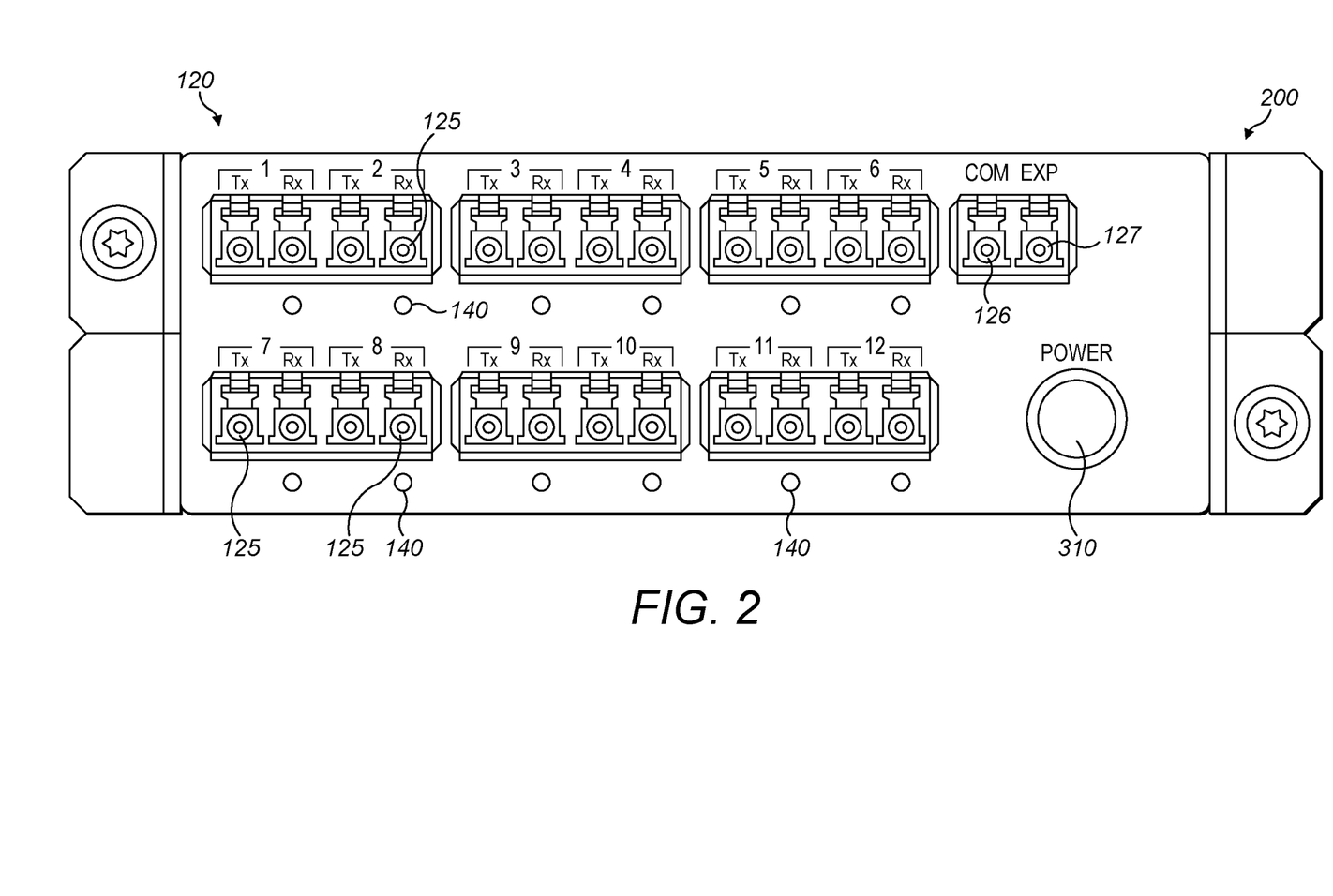
FIG. 2 shows a passive optical communications equipment comprising the indicator system of the present disclosure.

FIG. 2 shows a front side (front plate) of the passive optical filter unit 120. The optical filter unit 120 comprises a plurality of ports 125 for connecting to optical connections of the optical link 106. In this example, there are separate ports for transmission of optical signals (Tx) 130 and receiving optical signals (Rx) 135.

The optical filter unit 120 comprises an indicator system 200 configured to detect the presence of an optical signal on a port 125 and display the presence using a plurality of indicators 140 configured to indicate if an optical signal is present on a particular one of the ports 125. In this example, the optical link 106 is operating in Single Fiber Working (SFW). The passive optical filter unit is an Add/Drop filter with twelve add/drop ports 125 (1 to 12 in the front-plate), an aggregate WDM port (COM port) 126 and a possible expansion port 127 (EXP port to interconnect more similar units on different optical bands). The ports 125 comprise a set of receive ports 125 and a set of transmit ports 125. The aggregate WDM signal is connected to the COM port and it is then filtered into its components (wavelengths). This is only an example, and the implementation can be generalized to a greater or a fewer number of ports, provided the circuitry is dimensioned accordingly. Moreover, the type of filter (single fiber working or dual fiber working) and its band are not relevant: it could be a DWDM or a CWDM, an Add/Drop filter or a Multiplex/Demultiplexer or any filtering technology.

At least some of the ports, in particular the receiving optical ports 125, are provided with an indicator 140 configured to indicate if an optical signal is present on that particular port. In the example shown, the indicator 140 is a light emitting diode (LED). The indicator 140 is located in close proximity to the port 125 it is providing an indication for. The indicator is 140 is arranged to clearly indicate which port it is associated with. In this example, the indicator is located directly below the associated port 125.

The indicators require electrical power in order to detect the presence of an optical signal and control the indicator 140 (e.g. switch on the LED if an optical signal is present). The remote site 104 and conventional optical filter unit do not have an electrical power supply. An aspect of the present disclosure is to provide an optical filter unit with a self-contained indicator system. The indicator system is self-contained in having an electrical power supply which is contained, i.e. only local, to the optical filter unit. In particular, the electrical power supply is not connected to a mains electrical power supply or electrical power cable to another unit at the remote site. The indicator system 200 further comprises a power source self-contained at the remote site, and in some examples, attached to the passive communications equipment. In some examples, the indicator system 200 comprises a power source having an actuator 310, which will be described in more detail below.

Additionally or alternatively, the indicator system is self-contained in determining the indication based only on local information, i.e. without receiving a signal controlling the indicator from the central office or another network node. The control of the indication is based on a local detection of the optical signal, i.e. at the optical filter unit.

Figure 3:
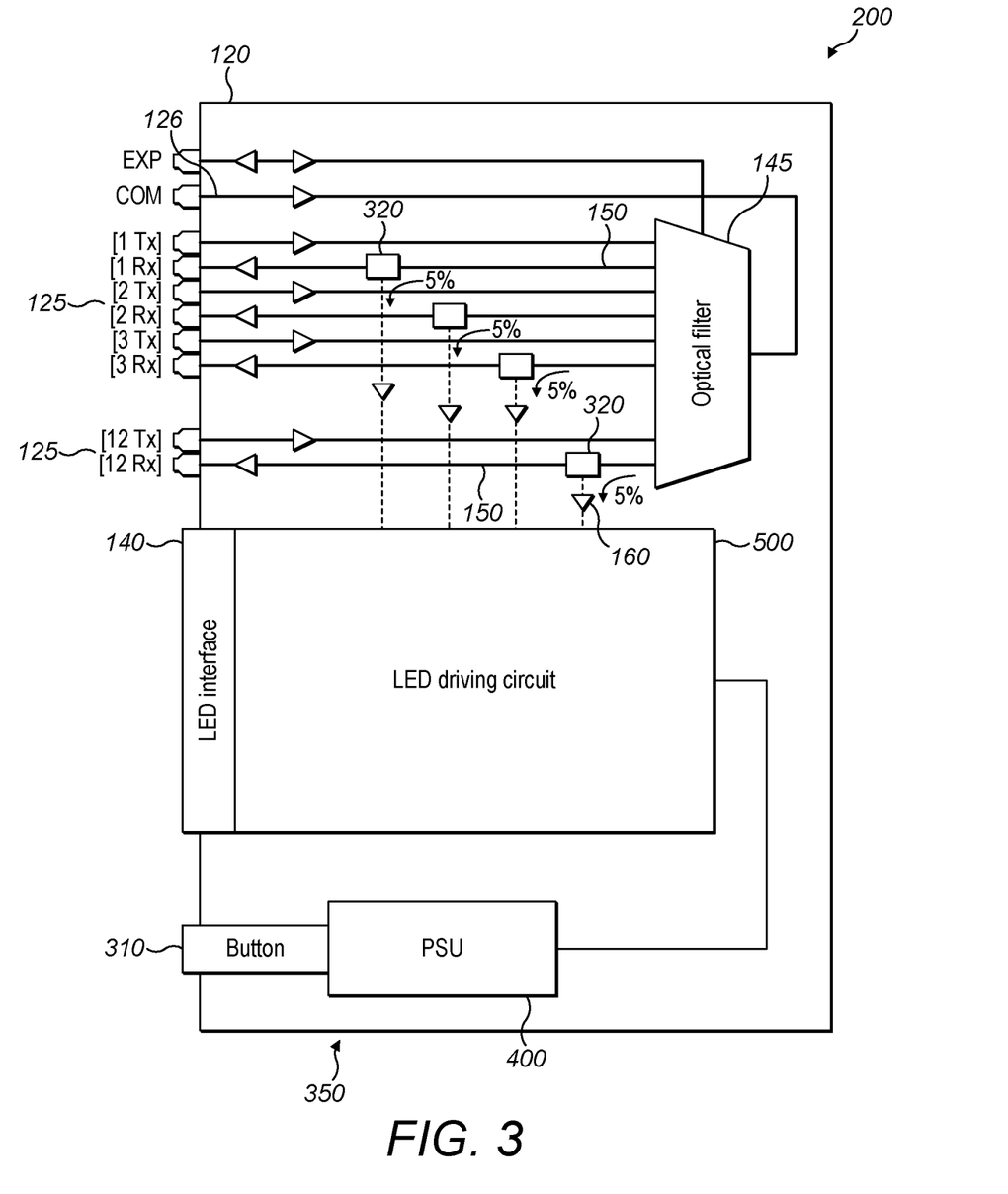
FIG. 3 shows part of the indicator system of the present disclosure.

FIG. 3 describes further details of the indicator system 200. The optical filter unit 120 comprises an optical filter 145 configured to demultiplex/multiplex wavelength division multiplexed (WDM) optical signals on the COM port 126 onto a plurality of separate optical lines 150 for each wavelength, and connected to each optical port 125. The optical filter unit 120 comprises separate optical lines 150 for transmission and receiving. The indicator system 200 is configured to detect the presence of WDM optical signals separated by a demultiplexer (optical filter 145) onto separate optical ports 125.

The indicator system 200 comprises monitoring taps 320 on a set of the optical lines 150 for which an indication is provided, e.g. on all of the receive lines 150 for the receive ports 125. The receive lines are for downstream traffic, from CO to Radio units. The monitoring tap 320 extracts a small proportion of the received light, e.g. 5%, on each port.

The tapped optical signals are sent to a driving circuitry 500 (described below) which monitors the presence of light on each optical line and determines whether to switch on the relevant indication when an optical signal is detected. The driving circuitry 500 comprises (or is connected to) the indicators 140. In some examples, one or more amplifiers 160 amplifies the tapped optical signal before the driving circuitry 500.

The indicator system 200, attached to the optical filter unit 120, further comprises a power source 350. The power source 350 provides electrical power to driving circuitry 500 and the indicators 140 (e.g. LEDs). The power source 350 comprises a power supply unit 400 comprising a mechanical to electrical converter, e.g. dynamo, configured to convert mechanical motion into electrical energy. The power supply unit 400 further comprises circuitry to control the power (i.e. voltage and/or current) generated. The power source 350 further comprises an actuator 310 for movement by a user of the optical filter unit. For example, the actuator 310 is mounted on an exterior surface of the optical filter unit 120, e.g. on the front plate as shown. Alternatively, the actuator 310 may be attached to a different surface or connected to the optical filter unit. The actuator may be in the form of a button which can be depressed, i.e. moved by a finger of the user. The actuator 310 may take any form in which one part is moved relative to another, e.g. alternatively by rotating a crank. The actuator 310 may be configured to power the mechanical to electrical convertor (i.e. generator) using a linear movement or rotational movement. In some examples, the actuator powers the generator directly or powers the generator via a mechanical converting apparatus, e.g. configured to convert linear motion to rotational motion. In some examples, the actuator may power a temporary mechanical energy storage, e.g. flywheel, or temporary electrical storage (e.g. capacitor).

Figure 4:
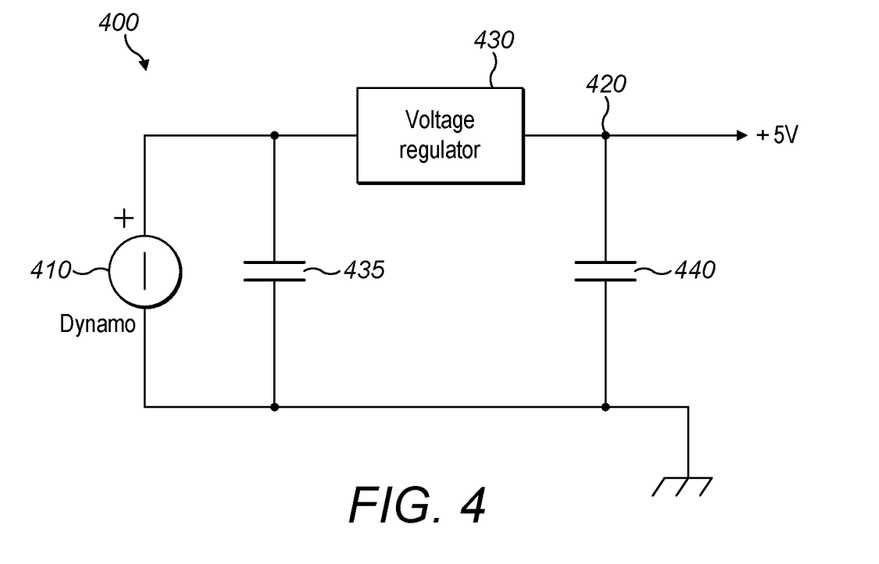
FIG. 4 shows part of the circuitry of the indicator system of the present disclosure.

FIG. 4 shows an example electrical circuit 400 for the power source. The electrical circuit 400 comprises the mechanical to electrical converter, e.g. dynamo 410, for example powered using the actuator 310 described above. In other examples, the electrical circuit 400 may be considered as connected to the mechanical to electrical converter 410. The electrical circuit 400, or circuitry, is configured to output a constant (if possible) voltage power supply at output 420, e.g. at +5 Volts. The output 420 has a direct current (DC).

The electrical circuit 400 comprises circuitry arranged to at least partially control the output from the dynamo. The voltage at output 420 may be limited to a maximum voltage by a voltage regulator 430, e.g. +5V. The electrical circuit 400 may further comprise circuitry configured to smooth transients in the output from the generator. For example, the electrical circuit 400 comprises one or more capacitors 435, 440 arranged in parallel with the generator. The electrical circuit will not be able to sustain beyond a short period the providing of electrical power once mechanical motion has ceased. Thus, once mechanical motion has ceased, the voltage and/or current supplied by the electrical circuit will drop to a point to a level where the photodetectors and indicators will not function. The electrical to mechanical converter is the only source of electrical power for the indicator system 200, e.g. there is no battery or external mains electrical connection. Thus, once mechanical motion of the actuator has ceased (and temporary energy storage e.g. from a flywheel) has been used, the indicator system will stop functioning. However, the indication provided for only that short period of time allows a field engineer to identify an active port, and a further movement of the actuator will re-start functioning of the indicator system. It will be appreciated that the circuitry described is an example only. Other designs of circuitry, using the same or different components, may be used to control the output from the generator.

Figure 5:
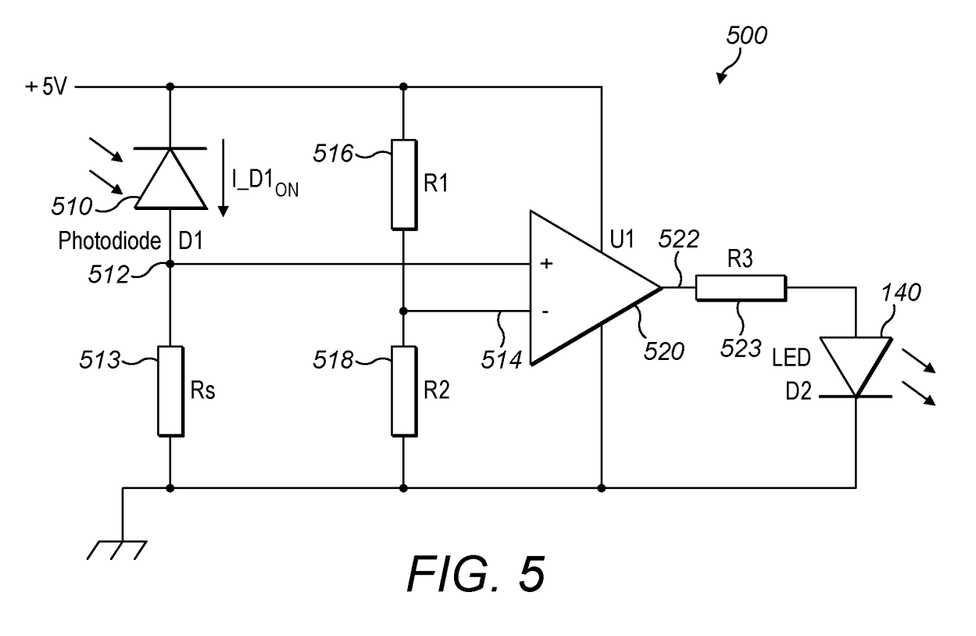
FIG. 5 shows a further part of the circuitry of the indicator system of the present disclosure.

FIG. 5 shows driving circuitry 500 of the indicator system for each indicator. The driving circuitry 500 is configured to detect the presence of an optical signal. The driving circuitry 500 is further configured to control an indicator 140, e.g. LED. The driving circuitry 500 is configured to indicate the presence of an optical signal, e.g. that the indicator is on (e.g. LED is on) when the optical signal is present. The driving circuitry 500 is configured to receive electrical power from the power source 350, e.g. connected to output 420. The driving circuitry 500 is simple circuitry which does not involve digital or management interfaces.

In the driving circuitry 500, a photodiode 510 is configured to detect the presence of an optical signal, from the tap of the optical port. An output voltage of the photodiode, indicating the presence of the optical signal is compared with a threshold voltage. In this example, the output voltage at 512 of the photodiode, controlled using resistor Rs 513, is compared with a threshold voltage at 514, set by the relative values of resistor R1 516 and resistor R2 518. An operational amplifier 520 is used for the comparison. An output 522 of the operational amplifier 520, via resistor R3 523, drives an LED 140 to either light up if the output 522 is high, or not light up if the output 522 is low. Thus, the detection and indication may be carried out with simple circuitry. It will appreciated that different or further components may be included, in order to achieve this function.

For example, the minimum level of light power that will be considered as "signal present/live" can be considered to be around −36 dBm (~250 nW). This value corresponds to a 5% tapping of a received signal of −20 dBm, which is typical of current transceivers dynamic range, with 3 dB of added margin.

At output 512 (marked as D1), a current ($I\_D1_{ON}$) is expected of around 250 nA assuming a photodiode responsivity close to 1. The circuit 500 provides for switching on the LED 140 when the photodiode detects the presence of light.

The disclosure aims to solve a serviceability problem and facilitate the installation at a remote site. It may be of assistance for the installer to have an indication of exactly which connectors are to be used on the passive filter ports, that is the ports relevant to the frequencies activated in the CO. Nevertheless, the indication could be of help at any time (e.g. during maintenance operations) to verify, irrespective of the connections, which are the ports on which light/traffic is "live" and those with no live traffic, for example due to loss of signal or switched-off at the CO for any reason.

At the CO, the field engineer can properly set the transceiver frequencies (either with fixed or tunable lasers) to match the filter ports.

At a remote site where the indicator system is located, it is not known a-priori which are the frequencies in use, since this depends on the association done at CO. The disclosure describes a means to visualize on an LED positioned on each port of the passive filter in use at a Remote site if the optical signal is present or not, therefore indicating to the operator/installer which ports are connected with "live light" at CO. This allows the field engineer (e.g. operator/installer) to:

If there are fixed transceivers at the remote sites, the field engineer is able to read or deduce an associated frequency from printed characters on the filter front plate (e.g. the value of the frequency or a character/number that is associated with a frequency according to a specific frequency plan) and connect the right connector (e.g. SFP).

If there are tunable transceiver at the remote site: the field engineer is able to simply connect a tunable transceiver to ports of the filter which are indicated to have an optical signal.

Using the indicator system 200, the end-to-end (E2E) connectivity between the CO and the remote transceivers is reliably provided, in which the connection errors are reduced. For example, operations in the sometimes difficult outdoor environment (e.g. at a top of a pole) is simplified. The filter unit at the remote site may be a passive unit (e.g. passive elements). In examples, the energy required to detect the presence of light on specific frequencies, and to power ON the relevant LEDs, is provided by the operator themselves. For example, the power is provided through mechanical-electrical energy conversion. In some examples, the mechanical-electrical energy conversion may be achieved using the actuator described above as a button positioned on the passive filter.

The disclosure provides a means to visualize on a passive optical filter unit through a front-plate LED interface, the presence of the optical signal on each one of the ports of the filter. The aggregate WDM signal is connected to the COM port and it is then filtered into its components (wavelengths).

In this example, the monitoring and associated indicators (LEDs) are positioned only on the downstream direction (on Rx side of each port of the filter). In other aspects, the indicator system may also be applied to the upstream (Tx) direction. In that case, further indicators are used to monitor, with associated LEDs, also the upstream traffic. The same monitoring using taps and the circuitry described above is also applicable to the Tx direction. In this case, the circuitry may be duplicated or extended to serve both directions and sets of LEDs for both the Tx and Rx directions. In some examples, indicators (e.g. LEDs) of different colors may be used to distinguish the Tx direction from the Rx direction. Alternatively, circuitry is configured to provide both directions, e.g. using a multi-color LED on each port. For example, the indicator system may indicate the presence of an optical signal in the Rx direction for a defined time period (e.g. a few seconds) and then for the Tx direction for a further defined time period (e.g. a further few seconds). The disclosure is applicable to any form of indicating the presence of optical signals in Tx and/or Rx directions, based on monitoring of the optical signals at the passive unit using a self-contained power source. In some examples, the self-contained power source uses a mechanical-electrical convertor.

A large part of the electrical power will be used to switch on the LEDs; for example an LED needs an electrical power in the range of 5 mW-40 mW to light, and 20 mW is used here as an example. To supply 12 LEDs simultaneously; we need a minimum power of 12×20 mW=420 mW. Thus, a total power supply of 0.5 W may be a realistic value for the maximum power needed by the circuitry of the indicator system. This amount of power easily achievable by the operator by mean of a "push button" activating a dynamo.

By moving the actuator 310 (e.g. pressing the button), the mechanical-electrical mechanism can produce around 0.5 W (e.g. $5V_{rms}$ at 100 mA). The voltage generated from the dynamo may be used to charge a temporary power storage device, e.g. a capacitor, at an input terminal of the voltage regulator shown in FIG. 4. The power source may be actuated multiple times to produce the needed amount of energy. When the voltage at the input of the regulator rises at or above the required level, e.g. 8V, the output voltage is available to supply all the LED driving circuit.

For example, the circuitry may comprise two input capacitors of 10 mF $10V_{rated}$ (height 22 mm, diameter 20 mm). The energy stored in the capacitors at 8V is:

$$E_{Chigh}=\tfrac{1}{2}*C*V^2=\tfrac{1}{2}*20*10^{-3}F*8^2V^2=640 \text{ mJ}$$

The energy stored in the capacitor at 5V is:

$$E_{Clow}=\tfrac{1}{2}*C*V^2=\tfrac{1}{2}*20*10^{-3}F*5^2V^2=250 \text{ mJ}$$

The energy available during the capacitor discharge is the difference between the two's:

$$\Delta E_C=E_{Chigh}-E_{Clow}=640 \text{ mJ}-250 \text{ mJ}=390 \text{ mJ}$$

This energy guarantees a minimum working time "t" of:

$$t=\Delta E_C/P=390 \text{ mJ}/0.5 \text{ W}=0.78 \text{ seconds}$$

Continuing or repeatedly moving the actuator will provide a longer time of activation of the LEDs.

Figure 6:
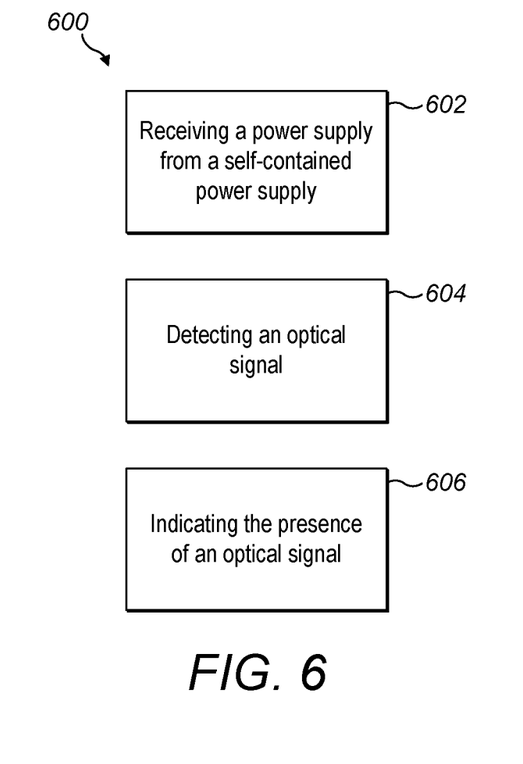
FIG. 6 shows a flowchart illustrating a method according to the present disclosure.

Aspects of the disclosure provide a method 600 of operation of a passive optical communications equipment. The method comprises receiving 602 a power supply from a power source. The power source is self-contained at the passive optical communications equipment, for example using the mechanical to electrical converter described above. The method further comprises detecting 604 an optical signal on optical ports of the passive optical communications equipment, using the power supply. For example, the detecting uses a photodetector, e.g. photodiode, as described above. The method further comprises indicating 606 the presence of the optical signals on the optical ports using a plurality of indicators. For example, the indicating uses the circuitry 500 to drive the LEDs 140.

The present disclosure provides a passive WDM mux-demux provided with per-port monitoring functions with associated LED indicators. The power supply for Monitoring Photodiode circuitry and LED circuitry being supplied by mechanical to electric energy conversion. The LED indicators provides monitoring to passive components located at points which have an absence of external power supply (e.g. passive cabinets, man-holes). The disclosure provides for an indicator system which uses low-cost components and simple circuitry. The indicator system does not require batteries or any externally connected power supply. The indicator systems simplifies commissioning of the passive optical communications equipment, reducing a chance of misconnection.

The invention claimed is:

1. An indicator system for optical ports of a passive optical communications equipment, the indicator system comprising:
   a plurality of photodetectors configured to detect an optical signal on the optical ports;
   an optical filter configured to demultiplex wavelength division multiplexed (WDM) optical signals on an aggregate WDM port onto a plurality of separate optical lines for each wavelength, and connected to each of the optical ports, wherein the indicator system detects presence of the WDM optical signals separated by the demultiplexer onto separate optical ports;
   a plurality of indicators configured to indicate on which optical ports an optical signal is detected by the photodetector; and
   a power source configured to provide power to the photodetectors and indicators, wherein the power source is self-contained at the passive optical communications equipment, wherein the power source comprises a button on an exterior surface of the passive optical communications equipment, and wherein the button is configured to generate power when depressed.

2. The indicator system of claim 1, wherein the button provides the power only to the photodetectors and indicators.

3. The indicator system of claim 1, wherein the button is an actuator on the exterior surface of the passive optical communications equipment, wherein movement of the actuator is configured to provide mechanical motion to drive a mechanical-to-electrical converter comprised in the power source.

4. The indicator system of claim 1, wherein the indicator system comprises circuitry configured to provide electrical power from the power source to the photodetectors and indicators, wherein the circuitry is configured to control a voltage and/or a current of the electrical power provided to the photodetectors and indicators.

5. The indicator system of claim 1, wherein the indicator system does not comprise a battery.

6. The indicator system of claim 1, wherein the indicator system comprises taps on optical lines connected to the passive optical communications equipment, wherein the photodetectors are configured to detect the optical signal from the taps.

7. The indicator system of claim 1, wherein the indicators comprise lights on the exterior surface of the passive optical communications equipment and adjacent to the optical port for which the light indicates the optical signal detected by the photodetector.

8. A method of operation of an indicator system for a passive optical communications equipment, the method comprising:
   receiving a power supply from a power source, wherein the power source is self-contained at the passive optical communications equipment;
   demultiplexing wavelength division multiplexed (WDM) optical signals on an aggregate WDM port onto a plurality of separate optical lines for each wavelength, wherein presence of the WDM optical signals separated onto separate optical ports is detected by the indicator system;
   detecting an optical signal on optical ports of the passive optical communications equipment, using the power supply; and indicating the presence of the optical signals on the optical ports with a plurality of indicators, using the power supply; and wherein receiving the power supply comprises receiving the power supply from a button on an exterior surface of the passive optical communications equipment, and wherein the button generates power when depressed.

9. The method of claim 8, wherein the button provides the power only to the photodetectors and indicators.

10. The method of claim 8, wherein the button is an actuator on the exterior surface of the passive optical communications equipment, and movement of the actuator provides mechanical motion to drive a mechanical-to-electrical converter comprised in the power source.

11. The method of claim 8, wherein receiving the power supply comprises controlling a voltage and/or a current of the electrical power provided to the photodetectors and indicators.

12. The method of claim 8, wherein the indicator system does not comprise a battery.

13. The method of claim 8, wherein detecting the optical signal comprises detecting the optical signal from tapping of optical lines connected to the passive optical communications equipment.

14. The method of claim 8, wherein the indicating comprises using lights on the exterior surface of the passive optical communications equipment and adjacent to the optical port for which the light indicates the optical signal.

* * * * *